(12) United States Patent
Kyrönaho et al.

(10) Patent No.: US 7,372,833 B2
(45) Date of Patent: May 13, 2008

(54) RESOURCE ALLOCATION IN PACKET NETWORK

(75) Inventors: Jukka Kyrönaho, Helsinki (FI); Timo Enqvist, Perttula (FI)

(73) Assignee: Nokia Corporation, Espoo (FI)

( * ) Notice: Subject to any disclaimer, the term of this patent is extended or adjusted under 35 U.S.C. 154(b) by 1114 days.

(21) Appl. No.: 10/275,330

(22) PCT Filed: Apr. 26, 2001

(86) PCT No.: PCT/FI01/00401

§ 371 (c)(1),
(2), (4) Date: Nov. 8, 2002

(87) PCT Pub. No.: WO01/86910

PCT Pub. Date: Nov. 15, 2001

(65) Prior Publication Data

US 2003/0147401 A1  Aug. 7, 2003

(30) Foreign Application Priority Data

May 10, 2000  (FI)  .................................. 20001091

(51) Int. Cl.
*H04Q 7/00* (2006.01)
*H04B 7/216* (2006.01)

(52) U.S. Cl. ...................... 370/331; 370/332; 370/335; 370/342

(58) Field of Classification Search ........... 370/395.41, 370/252, 254, 468, 348, 349, 355, 356, 235, 370/236, 231, 330, 329, 328, 395.5
See application file for complete search history.

(56) References Cited

U.S. PATENT DOCUMENTS

| | | | |
|---|---|---|---|
| 5,802,106 A | 9/1998 | Packer | 370/225 |
| 5,982,780 A * | 11/1999 | Bohm et al. | 370/450 |
| 6,023,606 A | 2/2000 | Monte et al. | 455/13.1 |
| 6,504,821 B2 * | 1/2003 | Berger | 370/236.1 |
| 6,657,958 B1 * | 12/2003 | Tanaka | 370/230.1 |
| 6,850,489 B1 * | 2/2005 | Omi et al. | 370/230 |

FOREIGN PATENT DOCUMENTS

| | | |
|---|---|---|
| EP | 0 973 303 A2 | 1/2000 |
| WO | WO 97/45978 | 12/1997 |
| WO | WO 00/02395 | 1/2000 |

* cited by examiner

*Primary Examiner*—Firmin Backer
*Assistant Examiner*—Farah Faroul
(74) *Attorney, Agent, or Firm*—Squire, Sanders & Dempsey, L.L.P.

(57) ABSTRACT

The idea of the invention is to negotiate the resource allocation between two network elements on the Application or Transport layer level so that the negotiation is possible over the network, even if the network comprises several physically different networks. To determine the transmission capacity for the allocation, the sending element must first send a request message with a proposal for the capacity and media types. The receiving element either accepts the proposal or makes a new proposal by changing the parameter values so that they are acceptable from the point of view of the receiver, and sends a response to the sending element. Based on the response from the receiving element, the sending element the either accepts or rejects the allocation and informs the receiving element of its decision by sending a confirmation.

17 Claims, 3 Drawing Sheets

```
 0 1 2 3 4 5 6 7 8 9 0 1 2 3 4 5 6 7 8 9 0 1 2 3 4 5 6 7 8 9 0 1
```

| VERSION | MESSAGE | LENGTH | RESERV. |
|---|---|---|---|
| INITIAL TOKEN ||||
| INITIAL TICKET ||||
| MEDIA TYPE | MEDIA PROPERTY || TARIF |
| CAPACITY ||||
| TIME FOR VALIDITY ||||

| VERSION | MESSAGE | LENGTH | RESERV. |
|---|---|---|---|
| RESPONSE TOKEN ||||
| INITIAL TICKET ||||
| SECOND PARTY TICKET ||||
| MEDIA TYPE | MEDIA PROPERTY || TARIF |
| CAPACITY ||||
| TIME FOR VALIDITY ||||

| VERSION | MESSAGE | LENGTH | RESERV. |
|---------|---------|--------|---------|
| RESPONSE TOKEN ||||
| INITIAL TICKET ||||
| SECOND PARTY TICKET ||||
| TIME FOR PENDING ||||

```
 0 1 2 3 4 5 6 7 8 9 0 1 2 3 4 5 6 7 8 9 0 1 2 3 4 5 6 7 8 9 0 1
```

| VERSION | MESSAGE | LENGTH | RESERV. |
|---------|---------|--------|---------|
| RESPONSE TOKEN ||||
| INITIAL TICKET ||||
| SECOND PARTY TICKET ||||
| TIME FOR RELEASE ||||

RESOURCE ALLOCATION IN PACKET NETWORK

FIELD OF THE INVENTION

This invention relates to resource allocation in packet switching networks, especially in IP networks.

BACKGROUND OF THE INVENTION

The tasks of a network are divided into several entities, called layers, that handle specified tasks. For example, it is possible to separate four distinct layers in IP networks: the Link, Network, Transport and Application layer (FIG. 1). In known IP networks signaling handles mainly channel related matters, such as connection set up and connection break off, while management handles element configuration, monitoring, and error messages, for example.

The Network layer is the heart of the IP network. It specifies the format of the Internet packets, called datagrams. Datagrams contain specified fields, such as the destination and the source of the datagram packet. Information is sent by packets which contain the information for routing the packet to the right destination element. The routers in the network must know how to route the packets to the right receiver, so the IP layer also includes a set of rules defining how the packets should be processed.

The Transport layer specifies means for identifying the ultimate destination, i.e. the application in the receiving network element. The two most common ways to handle the transport of a packet are UDP (User Datagram Protocol) and TCP (Transmission Control Protocol). UDP is an unreliable connectionless delivery system, while TCP provides reliable delivery. That means that the TCP sender and receiver must agree that a connection is desired. TCP requires an acknowledgment message from the receiver before the sender is allowed to send more packets. TCP uses a sliding window technique to send acknowledgments. The sliding window indicates the number of packets that a sender can send without receiving an acknowledgment. When the sender gets the acknowledgment concerning the first packet sent, the window slides, making it possible to send a new packet. The receiver can advise the sender what the preferable size for the sliding window is (specifying the receiver's current buffer size). In other words, the sliding window technique can be used for flow control.

The Application layer handles a variety of tasks, such as e-mail and file transport. This layer also contains SNMP (Simple Network Management Protocol) that handles matters such as configuration of network elements and monitoring.

The Link layer consists of a physical network, such as Ethernet and ATM. In ATM networks, for example, it is possible to group several virtual channels together into a virtual path, that is an individual manageable object.

The disadvantage of the known solutions is that there is no common way to handle the allocation of network resources in a packet network, such as an IP network. Known resource allocations are dependent on network characteristics, and thus run on the Link layer. In other words, resource allocation is possible only in the same physical network, such as ATM, but it is impossible to negotiate resource allocation between two network elements in different networks using one common environment. Due to the lack of a common resource allocation method, it is complicated to agree on traffic allocation, for example between operators. Dynamic allocation can also be tedious. The objective of the invention is to eliminate these disadvantages. This is achieved in a way described in the claims.

SUMMARY OF THE INVENTION

The idea of the invention is to negotiate the resource allocation between two network elements on the Application or Transport layer level so that the negotiation is possible over the network, even if the network comprises several physically different networks. To determine the transmission capacity for the allocation, the sending element must first send a request message with a proposal for the capacity and media types. The receiving element either accepts the proposal or makes a new proposal by changing the parameter values so that they are acceptable from the point of view of the receiver, and sends a response to the sending element. Based on the response from the receiving element, the sending element the either accepts or rejects the allocation and informs the receiving element of its decision by sending a confirmation.

BRIEF DESCRIPTION OF THE DRAWINGS

In the following the invention is described in more detail by means of FIGS. 2-7 in the attached drawings, where FIG. 3 depicts a capacity allocation request according to the invention, FIG. 4 depicts a response for the capacity allocation request according to the invention.

DETAILED DESCRIPTION OF THE INVENTION

A communication network consists of many different elements, such as exchanges and switches in traditional PSTN networks, base stations and mobile switching centers in mobile networks, and bridges and routers in datacommunication networks. Networks also contain data and signaling channels between the different elements. A packet switching IP network is more like a virtual network, which is built over several physical networks.

Resource allocation involves a transmission capacity agreement between two network elements. The transmission capacity agreement can contain, for example, the number of channels to be used, the type of the channels (audio, data, fax, etc.) and the bandwidth of the channels. Generally, existing technology does not include a way to negotiate resource allocation between different network elements over a variety of different networks. In order that resource allocation is possible in a packet network, there must be a common way to negotiate allocations.

Figure 1:
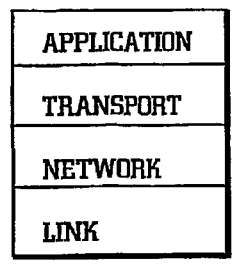
FIG. 1 illustrates layers of a packet switching network.
Figure 2:
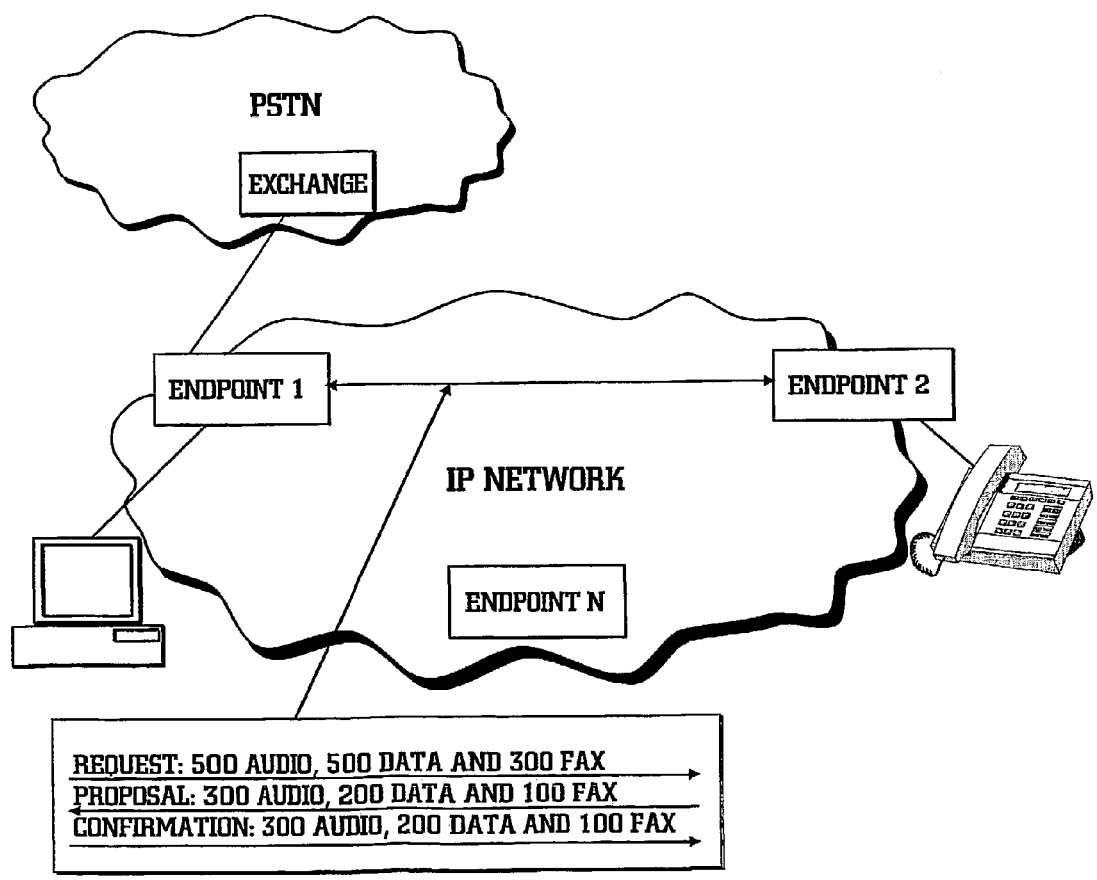
FIG. 2 illustrates a capacity allocation according to the invention.

FIG. 2 depicts an example of a packet switching virtual network (IP network). The virtual network can contain many subnetworks, but because the virtual network forms a common way for transmission, it is reasonable to picture the network as one entity. The virtual network can have connections to other networks, such as PSTN. In this context, it is also reasonable to name the network elements in a uniform way. Let's call the elements endpoints. In real physical networks endpoints are exchanges, routers, switching centers, etc.

FIG. 2 shows an example of how a negotiation of the resource allocation between endpoint 1 and endpoint 2 is made according to the invention. The goal is to agree on the biggest possible traffic capacity between the endpoints. The negotiation channel between the endpoints is preferably formed by signaling channels in the IP network. The network handles routing of the signaling, and it is not a part of the invention. An endpoint is responsible for handling certain traffic capacity needs from the part of the network that is connected to the endpoint (for example a local exchange). The endpoint can also be responsible for handling by-pass traffic (for example a router). FIG. 2 depicts the situation where endpoint 1 and endpoint 2 handle the traffic of their respective subnetworks. The negotiation between endpoints 1 and 2 starts when endpoint 1 sends a request for capacity needs. The request contains the number of different channel types required, for example 500 audio channels, 500 data channels and 300 fax channels. Endpoint 2 receives the request and compares it to it's own resources. If endpoint 2 has enough capacity to handle the amount requested, it accepts the request and sends back a proposal with the same capacity values. If endpoint 2 does not accept the request, it processes the maximum acceptable values that are still smaller than the values in the request, for example 300 audio channels, 200 data channels and 100 fax channels, and sends the proposal with new values back to endpoint 1. Endpoint 1 receives the proposal, makes a decision on the acceptability of the resource allocation, and sends a confirmation comprising the decision to endpoint 2.

The function of the negotiation process according to the invention can be divided into two mandatory portions: Initial Negotiation and Re-negotiation, and two optional portions: Pending Option and Removing Option.

The Initial Negotiation includes the request, the response, and the confirmation as described above. The format of the request is depicted in FIG. 3. The request, like the other messages according to the invention as well, is sent over TCP or UDP, i.e. in the data field of these protocols. Version (4 bits) is a model version of the format. Version makes an adaptation possible between different updated model versions. Message (8 bits) identifies the message and allows fast interpretation of the message content. Length (2 octets) tells the length of the message in octets. Reservation (4 bits) is reserved for future use. Initial Token (4 octets) identifies the sender who has initialized the request. Initial Ticket (4 octets) is a parameter that is set by the sender. The receiver records the value of the Initial Ticket. The meaning of the Initial Ticket is to identify the negotiation. Media Type identifies the desired media type, i.e. audio, video, fax, or data. Media Property (2 octets) tells the bandwidth needed for the media type. Tariff (1 octet) contains tariff information related to capacity reservation. Capacity (4 octets) tells the capacity reserved in units of media used (number of channels). Time for Validity is the time value indicating how long the negotiated capacity is valid. Media Type and Capacity are mandatory fields, whereas Media Property, Tariff, and Time for Validity are optional fields.

Response (FIG. 4) contains the same fields as the request format except that Initial Token is replaced by Response Token, and there is a new field: Second Party Ticket. The Response Token identifies the sender of the initial request. The Second Party Ticket is set by the receiver and recorded by the sender of the initial request. The Second Party Ticket identifies the capacity negotiation, and it is used for further negotiation to change the resource allocation. The Capacity remains the same as in the Request if the receiver accepts it, otherwise the receiver uses it's own values.

The format of the confirmation is the same as the format of the response. The sender of the initial request sends the confirmation to the receiver with parameters copied from the response. If the sender does not accept the values set by the receiver, it can refill the Capacity parameters to zero value indicating that the negotiation was unsuccessful. Later on, if needed, the sender can initialize a new negotiation.

Re-negotiation is used when either one of the endpoints wants to change the Capacity parameters. The endpoint that starts the negotiation must set Initial Ticket and Response Token to the same values as used in the initial negotiation, otherwise messages are silently discarded. The negotiation progresses the same way as in the initial negotiation.

Figures 5, 6, 7:
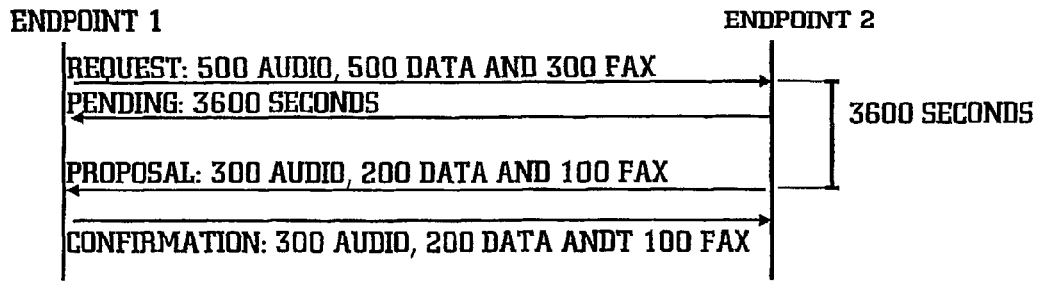
FIG. 5 depicts a pending message according to the invention.
FIG. 6 depicts a release of the resource allocation according to the invention.
FIG. 7 illustrates a time-out for a request.

Pending is an optional feature (FIG. 7) and it makes it possible to inform the initial sender of the request that the request is under process, and Response will be returned before the indicated time-out. In other words, Pending tells the time-out for the Request. The receiver sends Pending after receiving Request, but before sending Response. FIG. 5 depicts the format of Pending. A new field is Time for Pending. It is the time value for how long the delay in responding is supposed to last. The rest of the fields are the same as described above: Version, Message, Length, Reservation, Response Token, Initial Ticket, and Second Party Ticket.

Removing is also an optional feature, and it is used when one of the endpoints wants to remove the capacity reserved between the endpoints. The format of Removing is depicted in FIG. 6. There is one new parameter, Time for Release. The other parameters are familiar from the above. Time for Release is the time-out value that is needed before the resources negotiated are available. The removing function consists of two messages: Release and Release Acknowledged. The endpoint that starts Removing sends a Release message to the other endpoint. The Initial Ticket and Response Ticket fields in the release message are in the same values as in the initial negotiation, otherwise the message is discarded. The other endpoint sends back a Release Acknowledged message which does not include Time for Release information.

Table 1 collects the different messages together. Table 2 describes the different parameters.

TABLE 1

Messages

| Message Identifier | Message | Description |
| --- | --- | --- |
| 0x1 | Request | Initial request for Capacity |
| 0x2 | Response | Acknowledgment for initial request |
| 0x3 | Confirm | Final confirmation of the Request |
| 0x4 | Pending | Indicates that the Request is being processed and the handling of the Request may takes longer than usual. |
| 0x5 | Release | Releases reservation of capacity immediately or delayed, according of the Time for Validity parameter |
| 0x6 | Release Ack. | Confirms the Release operation proposed by other endpoint. |

| Parameter | Description |
| --- | --- |
| Version (4 bits) | Protocol version tells the updated version of the protocol. |
| Message (8 octet) | Message identifier identifies type of message. |

TABLE 1-continued

Messages

| | |
|---|---|
| Length (2 octets) | Tells Length of Message in octets starting from header. |
| Reserved (4 bits) | A field reserved for future use. |
| Initial Token (4 octets) | Identifies origin of the party which has initialized request |
| Response Token (4 octets) | Identifies origin of the party which has initialized response |
| Initial Ticket (4 octets) | Identifies capacity negotiation request and is used with further negotiations in later if original values are changed. |
| 2$^{nd}$ Party Ticket (4 octets) | Identifies capacity negotiation for 2$^{nd}$ party it is used with further negotiations by initiated 2$^{nd}$ party if original values are changed. |
| Media Type (1 octet) | Identifies the Media type. Possible values are Audio, Video, Fax or Data |
| Media Property (2 octets) | This field gives more detailed information of bandwith needed for media type. |
| Tariff (1 octet) | The parameter tells tariff information related to the reserved media package. |
| Capacity (4 octets) | Parameter tells capacity reserved for Media units i.e. number of calls, ports or connections. |
| Time for Validity (4 octets) | The time value in seconds for how long the negotiated capacity is valid. |
| Time for Pending (4 octets) | The time value in seconds for how long pending is estimated to last. |
| Time for Release (4 octets) | The time value in seconds for how long the negotiated capacity is available. |

The invention makes it possible to negotiate resource allocation between two endpoints over a network, comprised of several physically different networks. Routing is made as before in a packet switching network, but now there is a negotiation for the resource allocation. The benefits of the negotiation are that it makes transmission more certain, makes it possible to direct transmission traffic, and especially makes one common way for handling negotiations, although there can be several different physical networks between the endpoints.

An endpoint handles transmission capacity as one pool from where it is possible to make reservations for traffic to a certain endpoint, and so the traffic load is easier to divide evenly to different directions. Resource allocations can be changed dynamically, thus an endpoint can adapt easily to different situations, such as more telephone calls in evenings, special services like telephone calls to a popular TV show, and a company's needs to transmit huge amounts of data during the day time. The invention also makes it possible to negotiate resource allocation between two operators. In this situation a SLA (Service Level Agreement) is needed between the operators.

The situation in FIG. 2 where there is a negotiation for resource allocation between endpoint 1 and endpoint 2, it can be done with one negotiation for all media types. The Length field in message packets tells the total length of the negotiation message. In other words, data, audio, and fax types have their own message packets inside the negotiation message, such as a Request message. The bandwidth of a media type can be determinated in the Media Property field. Consequently, the total bandwidth needed for an allocation is the bandwidth of a media type multiplied by the value of the Capacity field. The invention is especially useful when the negotiation concerns huge amount of channels.

The invention is described above at the Application layer level, but it is clear that the invention can be implemented at the Transport layer level as well. The invention can be combined with other protocols as well. For example, tunneling over H. 323, Q.BICC, and SIGTRAN are possible by embedding the resource allocation information into the payload information. Although the invention is described more like a separate protocol, it can be integrated as a portion of another protocol. It is evident that the invention is not restricted to the above-mentioned examples, but that it can be used in other implementations within the scope of the inventive idea.

The invention claimed is:

1. A method for allocating transmission resources between first and second network elements, the method comprising:
    sending a request message, from the first network element to the second network element, the request message including a value of a capacity that the first element desires to allocate for use between the two network elements,
    receiving the request message in the second network element and finding a capacity value which is acceptable from the point of view of the second network element and not greater than the value received in the request message,
    sending a response message from the second network element to the first network element, the response message including the capacity value found in the second network element,
    receiving the response message in the first network element and making a decision, based on the capacity value received in the response message, on the acceptability of the resource allocation, and
    sending a confirmation message from the first network element to the second network element, the confirmation message including data indicating the decision made,
    wherein the first and second network elements are in a packet switching network comprising physically different networks, the first network element being the sending network element, wherein the resources are allocated by exchanging messages above a network layer between the first and second network elements,
    wherein the request message further includes a type of the capacity, a token for identifying the request, a bandwidth of the type of the capacity, tariff information related to the capacity, and time information indicating how long the resource allocation is to be valid.

2. A method according to claim 1, wherein the response message further includes:
    a type of the capacity to be allocated for use,
    a token for identifying the request, and
    a token for identifying the allocation session.

3. A method according to claim 2, wherein the response message further includes:
    a bandwidth of the type of the capacity,
    tariff information related to the capacity to be allocated for use, and
    time information indicating how long the resource allocation is to be valid.

4. A method according to claim 1, wherein the confirmation message includes:
    a type of the capacity to be allocated for use,
    the accepted value,
    a token for identifying the request, and
    a token for identifying a resource allocation session.

5. A method according to claim 4, wherein the confirmation message further includes:
    a bandwidth of the type of the capacity,
    tariff information related to the capacity to be allocated for use, and time information indicating how long the resource allocation is valid.

6. A method according to claim 1, wherein before sending the response message, the second network element sends a pending message to the first network element, the pending message including:
  a token for identifying the request,
  a token for identifying an allocation session, and
  time information indicating a maximum time period between the request message and the response message.

7. A method according to claim 1, wherein the method further includes:
  sending a release message from one network element to the other network element for releasing the resource allocation,
  sending a release-acknowledged-message from the network element that received the release message to the network element that sent the release message.

8. A method according to claim 7, wherein the release message includes:
  a token for identifying the request,
  a token for identifying the resource allocation session, and
  time information for indicating how long the resource allocation is available.

9. A system, comprising:
  a first network element configured to send a request message and a proposal capacity;
  a second network element configured to receive the proposal for capacity, and transmit a response to the first network element,
  wherein the first network element is further configured to receive the response and to make a decision based on the received response, of acceptability of resource allocation, and
  wherein the first network element is further configured to transmit a confirmation message to the second network element,
  wherein the request message further includes a type of the capacity, a token for identifying the request, a bandwidth of the type of the capacity, tariff information related to the capacity, and time information indicating how long the resource allocation is to be valid.

10. The system according to claim 9, wherein the response message further includes:
  a type of the capacity to be allocated for use,
  a token for identifying the request, and
  a token for identifying an allocation session.

11. The system according to claim 10, wherein the response message further includes:
  a bandwidth of the type of the capacity,
  tariff information related to the capacity to be allocated for use, and
  time information indicating how long the resource allocation is to be valid.

12. The system according to claim 9, wherein the confirmation message includes:
  a type of the capacity to be allocated for use,
  an accepted value of the resource allocation,
  a token for identifying the request, and
  a token for identifying the allocation session.

13. The system according to claim 12, wherein the confirmation message further includes:
  a bandwidth of the type of the capacity,
  tariff information related to the capacity to be allocated for use, and
  time information indicating how long the resource allocation is valid.

14. The system according to claim 9, wherein before sending the response message, the second network element sends a pending message to the first network element, the pending message including
  a token for identifying the request,
  a token for identifying an allocation session, and
  time information indicating the maximum time period between the request message and the response message.

15. The system according to claim 9, wherein the first network element is configured to send a release message from one network element to the other network element for releasing the resource allocation, and
  the second network element is configured to send a release-acknowledged-message to the first network element.

16. The system according to claim 15, wherein the release message includes:
  a token for identifying the request,
  a token for identifying an allocation session, and
  time information for indicating how long the resource allocation is available.

17. A system, comprising:
  a first network means for sending a request message and a proposal capacity;
  a second network means for receiving the proposal for capacity, and transmitting a response to the first network element,
  wherein the first network means is further configured for receiving the response and for making a decision based on the received response, of acceptability of resource allocation, and
  wherein the first network means is further configured for transmitting a confirmation message to the second network element
  wherein the request message further includes a type of the capacity, a token for identifying the request, a bandwidth of the type of the capacity, tariff information related to the capacity, and time information indicating how long the resource allocation is to be valid.

* * * * *